J. EDGAR & A. BARDELL.
Stove-Cover Lifter.
No. 166,084. Patented July 27, 1875.
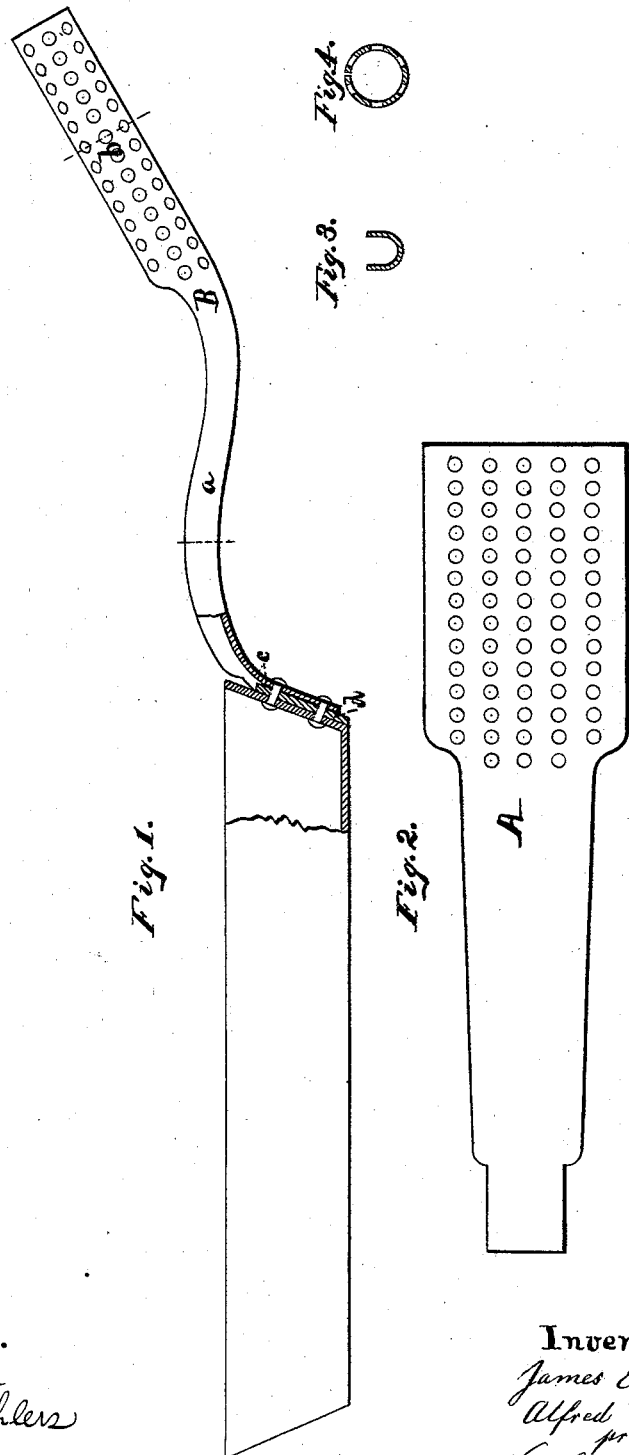
Witnesses.
Otto Hufeland
Chas Wahlers
Inventors.
James Edgar
Alfred Bardell
pr
Van Santvoord & Hauff
attys

UNITED STATES PATENT OFFICE.

JAMES EDGAR AND ALFRED BARDELL, OF NEW YORK, N. Y.

IMPROVEMENT IN STOVE-COVER LIFTERS.

Specification forming part of Letters Patent No. 166,084, dated July 27, 1875; application filed June 30, 1875.

*To all whom it may concern:*

Be it known that we, JAMES EDGAR and ALFRED BARDELL, both of the city, county, and State of New York, have invented a new and useful Improvement in Stove-Cover Lifters and in Handles for Frying-Pans, and other articles, which improvement is fully set forth in the following specification, reference being had to the accompanying drawing, in which—

Figure 1 represents a sectional side view. Fig. 2 is a plan of the blank from which our lifter or handle is made. Figs. 3 and 4 are transverse sections.

Similar letters indicate corresponding parts.

This invention consists in a sheet-metal handle, having a trough-like shank and a hollow cylindrical foraminous head, whereby a light and durable handle is produced. With this handle is combined a strengthening-plate or tip of wrought-iron, malleable iron, or any other suitable material, so that the same obtains sufficient strength for a stove-cover lifter, and that a firm and durable connection between the handle and the pan or other article to which the same is to be attached can be effected.

In the drawing, the letter A designates the blank from which we manufacture our lifter or handle. This blank is stamped out of sheet metal in the form shown in Fig. 2, that portion of said blank which is to form the head of the handle being perforated with a large number of holes. This blank is stamped up and bent so as to form the handle B, the shank $a$ of said handle being made in the form of an ogee-shaped trough, while the head $b$ of the handle forms a foraminous hollow cylinder, as shown in Figs. 1 and 4. The end of the shank $a$ forms a lip, $c$, to which is secured a strengthening-plate, $d$, so that when the handle is riveted or otherwise secured to the frying-pan or sauce-pan, or other article of a similar nature, and said article is exposed to the direct action of a fire or to a great heat, the handle is not liable to burn off. The lip $c$, on the shank of the handle, being made of the same piece of sheet metal from which the handle is formed, is necessarily weak, and if it should be secured to a frying-pan or other similar article the connection would be weak and liable to break or to burn off in a short time. Or if our handle is used as a stove-cover lifter the lip $c$ would be liable to break or to burn off, and the article would be spoiled. By combining with the lip $c$ a strengthening-plate, $d$, that part of the handle which forms the connection with the pan or other article becomes at least with equal strength with the shank $a$, and a durable handle or lifter is obtained.

Our handle is very light and cheap, and on account of its trough-like shank and foraminous head it is not liable to assume an uncomfortable temperature, so that it can always be grasped with the bare hand without danger of burning one's fingers.

What we claim as new, and desire to secure by Letters Patent, is—

1. A sheet-metal handle, constructed with the imperforate shank $a$ and perforated head $b$, substantially as herein shown and described.

2. In combination with a sheet-metal handle, constructed with a perforated head, $b$, imperforate shank $a$, and the lip $c$ of the re-enforcing-plate $d$, substantially as and for the purpose described.

In testimony that we claim the foregoing we have hereunto set our hands and seals this 28th day of June, 1875.

JAMES EDGAR. [L. S.]
ALFRED BARDELL. [L. S.]

Witnesses:
W. HAUFF,
E. E. KASTENHUBER.